US005812874A

United States Patent [19]

Yamashita et al.

[11] Patent Number: 5,812,874

[45] Date of Patent: Sep. 22, 1998

[54] EQUIPMENT MANAGEMENT SYSTEM

[75] Inventors: Yuji Yamashita; Jiro Nagira; Yasuhiro Hashimoto; Hiroshige Utatsu, all of Osaka, Japan

[73] Assignee: Mita Industrial Co., Ltd., Osaka, Japan

[21] Appl. No.: 757,505

[22] Filed: Nov. 27, 1996

[30] Foreign Application Priority Data

Nov. 29, 1995 [JP] Japan .................................... 7-310259

[51] Int. Cl.[6] ...................................................... G06F 13/00

[52] U.S. Cl. .......................... 395/830; 395/613; 395/651; 399/8

[58] Field of Search .................................... 395/830, 613, 395/616, 617, 622, 651, 653; 399/8–13

[56] References Cited

U.S. PATENT DOCUMENTS

| | | | |
|---|---|---|---|
| 5,077,582 | 12/1991 | Kravette et al. | 399/8 |
| 5,184,179 | 2/1993 | Tarr et al. | 399/8 |
| 5,250,942 | 10/1993 | Nakayama | 340/825.52 |
| 5,282,127 | 1/1994 | Mii | 364/130 |
| 5,369,471 | 11/1994 | Yamada | 399/8 |
| 5,394,458 | 2/1995 | Allen et al. | 379/1 |

*Primary Examiner*—Ayaz R. Sheikh
*Assistant Examiner*—Ario Etienne
*Attorney, Agent, or Firm*—Beveridge, DeGrandi, Weilacher & Young, L.L.P.

[57] ABSTRACT

In a management system in which a plurality of copiers are managed by a host computer, each copier is provided with a device that is connected to the host computer so as to manage the copier. The device can be initialized from the copier without advance registration in the host computer. To achieve this, when a serviceperson, having set up the copier, enters a registration code and executes initialization, the device communicates with the host computer and transmits thereto an initialization report. On receiving the initialization report, the host computer creates a database, and subsequently sets the device using predetermined values in the database and assigns thereto a copier ID number. When communication has been completed without errors, the device returns the copier ID number to the copier. To register the copier, an operator of the host computer opens a screen of a list of non-registered pieces of equipment to be managed in order to select and register the corresponding copier on that screen. Thus, a database is made ready for use in the host computer.

2 Claims, 8 Drawing Sheets

| 39 | 40 | 41 | 42 | 43 | 44 | 45 | 46 |
|---|---|---|---|---|---|---|---|
| SEL | DATE | TIME | PPC ID | MODEL | PERSONAL | SERIAL NO | SETUP CNT |
| Ⓐ | 04-12-95 | 10:20 | 12 | 809000 | 123456 | ****000002 | 15 |
| B | 04-12-95 | 09:12 | 11 | 928500 | 220088 | ****000155 | 220 |
| C | | | | | | | |
| D | | | | | | | |
| E | | | | | | | |

EQUIPMENT MANAGEMENT SYSTEM

BACKGROUND OF THE INVENTION

1. Field of the Invention

The present invention relates to an equipment management system in which communications control devices serving as terminal devices attached to electronic photocopiers are connected to a host computer installed at a management center managing those photocopiers over data communication lines, and particularly to an improvement on the initialization procedure for said devices.

2. Description of the Prior Art

Electronic photocopiers require various kinds of maintenance, such as replenishment of toner and paper, to maintain their copying functions. For this reason, the users of photocopiers usually sign a contract with a management center such as a maintenance service provider for long-term management of copiers in terms of various aspects of their maintenance as mentioned above. And, to enable the management center to carry out the contract without fail, there is usually provided a copier management system that is operated between the management center and the individual copiers regarded as terminals.

Generally, such a copier management system is constructed by connecting communications control devices attached to individual copiers to a host computer installed at a management center by way of public telephone lines. In this system, the host computer receives from the devices every kind of data, such as data for calling a serviceperson, concerning the copiers. Moreover, the host computer also sets on the devices of the individual copiers a variety of data, such as the telephone number of the host computer, the time at which regular dialing takes place, and the number of copies permitted to be made under the contract. Thus, the devices communicate with the host computer on the basis of data set as described above, and, in this way, the copiers are collectively managed.

In such a copier management system, when a copier and a device have been newly installed on a user's site, user-related and copier-related data is first registered in the host computer, and then the device is initialized. During the initialization, the host computer communicates with the device, and sets an ID number on it. Thereafter, the device uses the ID number, instead of its individual model name or other, when it regularly communicates with the host computer to send data requested by it.

As described above, the device is initialized by setting on it the copier ID number, the telephone number of the host computer, and other data. In a conventional copier management system, such initialization is conducted by two operators, one at the host computer of the management center and the other at the device of the copier, communicating with each other by telephone.

However, in most cases, a device of a copier shares a single telephone line with a facsimile machine or telephone set, and accordingly the device is set for transmission only, so that, even when the device receives a call, the device will not answer it. For this reason, for the host computer to establish a connection with the device, a special operation is needed to enable the device to answer a call. Moreover, the initialization operation based on telephone communication takes a long time and requires two operators, and thus it is neither cost-effective nor work-efficient.

To solve these problems, another type of conventional copier management system allows the device to be initialized by operation on the copier side alone. In this improved copier management system, the data of a targeted copier is registered in the host computer in advance, whereas a copier ID number and a check code are issued from the host computer when initialization is conducted.

To conduct initialization, a serviceperson is dispatched, with a memo on which the copier ID number and check code are noted down, to the site where the copier is installed. There, the operator first sets up the copier, and then conducts initialization of the device from the operation section of the copier. During this initialization, the operator enters the copier ID number and check code mentioned above as well as the telephone number of the host computer with which the device will communicate.

The device, on receiving an execution signal from the copier, dials the entered telephone number to start communication with the host computer. During the communication, the device checks the entered copier ID number and check code against those registered in the host computer, and, if they are found to agree completely, terminates the initialization.

However, in either of the above described conventional and improved systems, it is necessary to register the copier in the host computer in advance, and accordingly considerable time is required before the copier is actually installed and set up at a location of the user's choice. As a result, quite inconveniently, such systems cannot cope with the cases where the user demands immediate use of the copier.

Moreover, in the improved system, if the serviceperson forgets the copier ID number and check code or memorizes them incorrectly, he will never be able to clear the checking of those codes, and thus, quite inconveniently, the device will not be initialized in due course.

SUMMARY OF THE INVENTION

An object of the present invention is to provide an equipment management system in which a communications control device can be initialized from a managed piece of equipment such as a copier without fail even if the data concerning that piece of equipment has not yet been registered in a host computer or even if the checking of a code has failed despite of such data having already registered in the host computer.

The present invention is applicable to an equipment management system comprising a terminal device that is attached to a managed piece of equipment so as to transmit equipment management data needed for managing that managed piece of equipment and a host computer that is connected to the terminal device by way of a data communication line so as to collectively manage the equipment management data. Here, the host computer sets initial data on the terminal device.

In addition, to achieve the above object, in the present invention, the managed piece of equipment is equipped with an input operation means that inputs to the terminal device a registration code identifying the managed piece of equipment and thereafter conducts initialization. Moreover, the terminal device comprises a report creating means that creates an initialization report based only on the registration code when initialization is conducted. Furthermore, the host computer comprises a database creating means that creates a database when an initialization report is received from the terminal device, and a non-registered equipment list creating means.

Here, the host computer determines setting values for the terminal device preliminarily based on predetermined values in the database and, when the terminal device has acknowledged completion of setting, the host computer registers equipment management data of a managed piece of equipment whose initialization has been completed in the non-registered equipment list. Moreover, when equipment management data of the managed piece of equipment freely selected from the list is registered and stored in the database, the non-registered equipment list creating means deletes equipment management data of that managed piece of equipment from the list.

According to the above described construction, when a managed piece of equipment has been set up, a registration code is entered by the input operation means of the managed piece of equipment, and then initialization is conducted. Subsequently, the terminal device communicates with the host computer, and transmits thereto an initialization report created by the report creating means. The host computer, on receiving the initialization report, makes the database creating means create a database, and determines setting values for the terminal device preliminarily based on predetermined values in the database. At this time, the host computer opens a screen showing a list of non-registered pieces of equipment to be managed, and selects and registers the corresponding piece of equipment. Thus, in the host computer, a database is made ready for use.

As described above, according to the above construction, the device can be initialized from the managed piece of equipment even when no registration has been made in the host computer in advance. Accordingly, it is not necessary to monitor the operation of the serviceperson who sets up the managed piece of equipment. Moreover, as against a method that requires advance registration in the host computer, the ID number of the managed piece of equipment and the check code do not need to be memorized, nor do they need to be registered in advance before the managed piece of equipment is set up. As a result, it is possible to freely choose when to set up a managed piece of equipment. Furthermore, it is possible to recover from an initialization failure that has occurred during initialization based on advance registration in the host computer.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
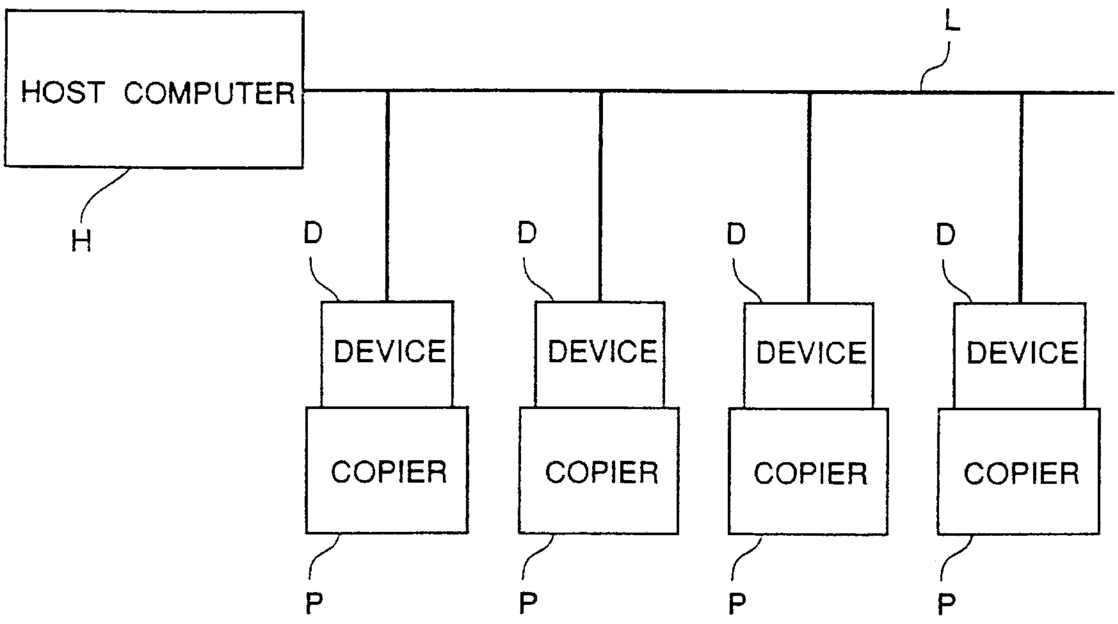
FIG. 1 is a block diagram showing the outline of the copier management system embodying the present invention.

Hereinafter, an embodiment in which the present invention is applied to a copier management system will be described with reference to the drawings. FIG. 1 schematically shows an example of such a copier management system. As shown in this figure, the copier management system consists of a plurality of copiers P as pieces of equipment to be managed and a host computer H installed at a management center and operated to manage maintenance of the copiers. The copiers P are each equipped with a communications control device D, serving as a terminal device, that is connected to the host computer H by way of a public telephone line L.

Figure 2:
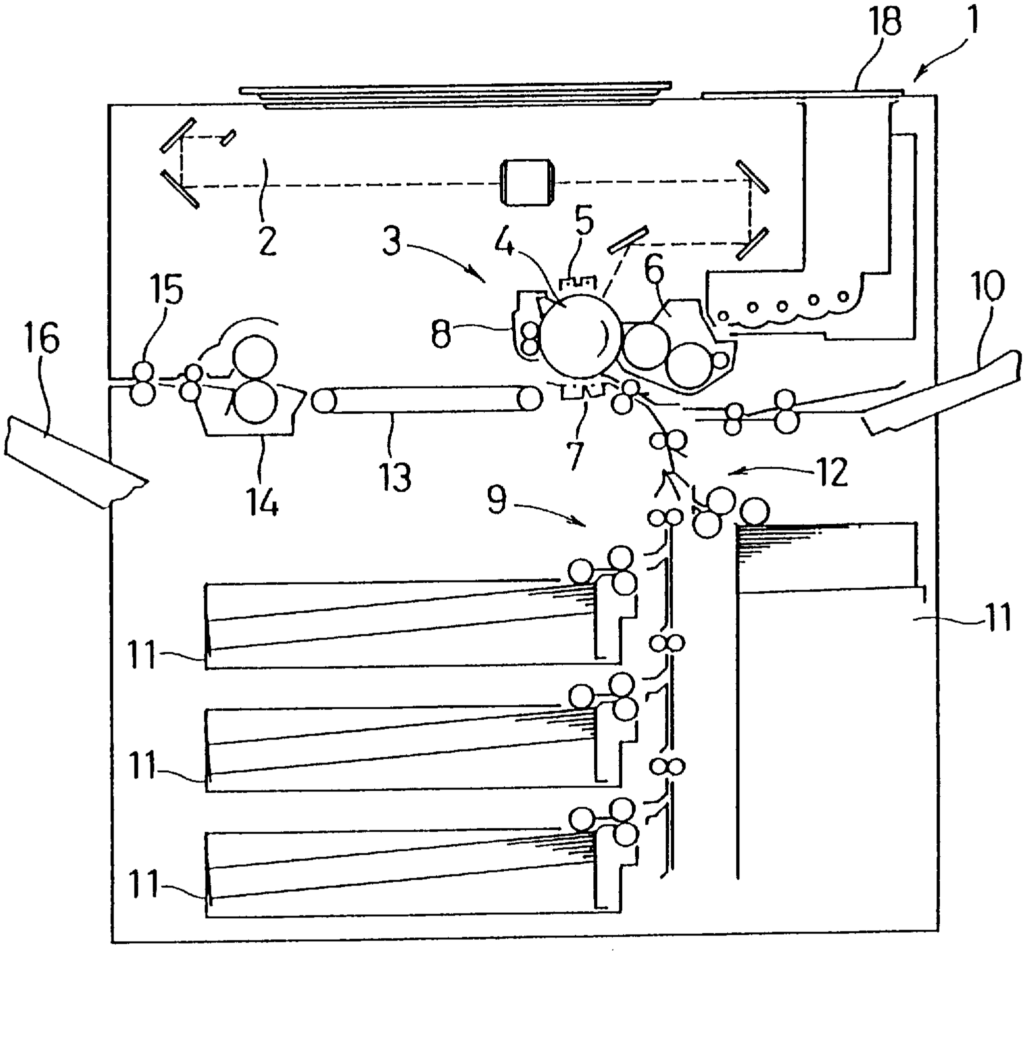
FIG. 2 is a cross-sectional view schematically showing the mechanical construction of the copier.

FIG. 2 shows the construction of the copier P. As shown in this figure, the copier P is provided with an optical system 2 fitted in the upper part of the body 1. The optical system 2 is for reading an original and comprises a light source, mirrors, a lens unit, and other components. In the central part of the copier body 1 is provided an image forming section 3 for forming an image with toner based on the read original. The image forming section 3 has a photosensitive drum 4, on the surface of which an electrostatic latent image is formed. Arranged around the photosensitive drum 4 are a main charger 5, a developing unit 6, a transferring and separating charger 7, and a cleaning unit 8.

In the lower part of the copier body 1 is provided a paper feed section 9. The paper feed section 9 comprises a bypass table 10 that is disposed in the right-hand part of the copier body 1 in FIG. 2, a plurality of paper feed cassettes 11 arranged vertically in the lower part of the copier body 1, and a paper transfer unit 12 for transferring paper sheets stocked in the bypass table 10 or paper feed cassettes 11 to the image forming section 3. Arranged on the downstream side of the image forming section 3 along the paper transfer direction are a paper ejecting conveyor 13 for conveying paper sheets to the left-hand part of the copier in FIG. 2, a fixing unit 14 for fixing a toner image on paper by fusion, ejecting rollers 15 for ejecting paper sheets after image fixation, and a ejected-paper tray 16 for stocking ejected paper sheets.

Figure 3:
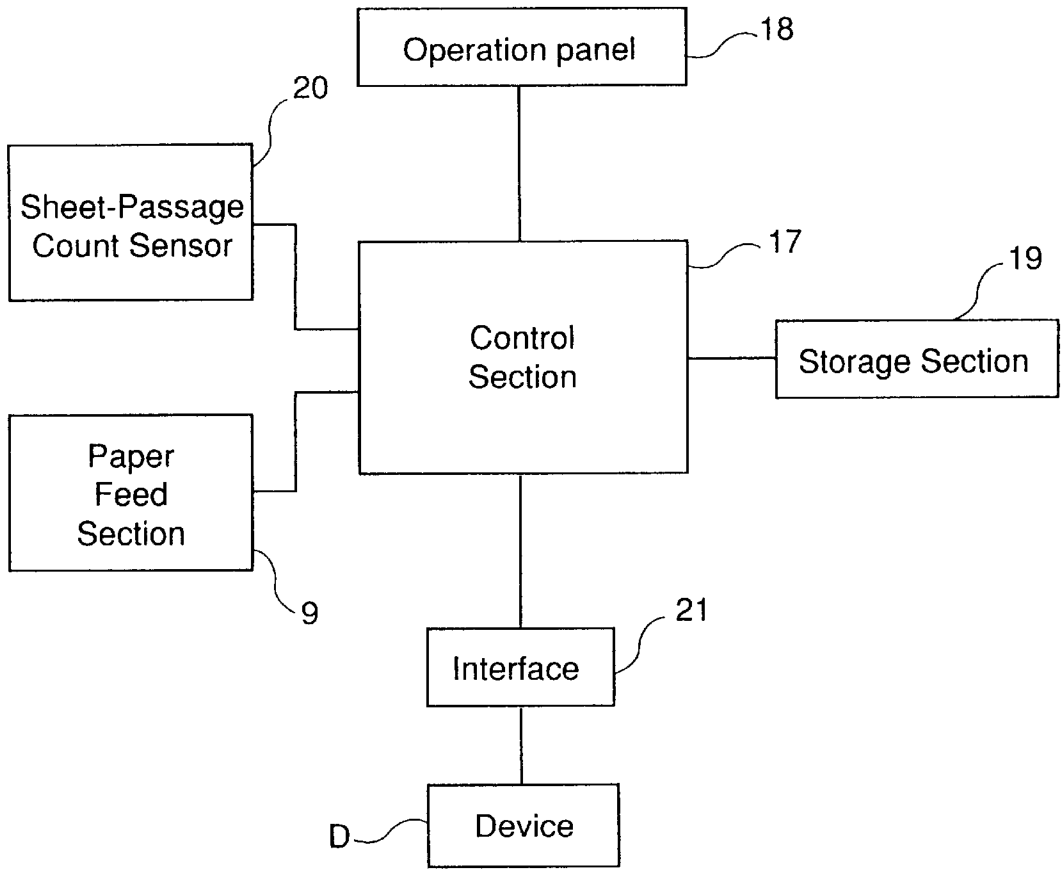
FIG. 3 is a block diagram showing the control system of the copier.

The copier body 1 is further equipped with a control section 17 shown in FIG. 3. The control section 17 is constructed as a microcomputer system including a CPU, a RAM, a ROM, a variety of drivers, and a variety of I/O ports. To the control section 17, an operation panel 18 serving as an input operation means is connected. As shown in FIG. 2, the operation panel 18 is disposed on the upper surface of the copier body 1, and includes an input keypad section and a display section composed of liquid crystal display devices, light emitting diodes, or other.

To the control section 17, a memory section 19 for storing a variety of operation data is connected. The memory section 19 stores, for example, the total count of copies produced by the copier body 1. Also connected to the control section 17 are a sheet-passage count sensor 20 for counting how many images have been formed, and a paper feed section 9 for feeding paper from paper feed cassettes 11.

In practice, the sheet-passage count sensor 20 consists of a plurality of sensors arranged in appropriate positions along the paper feed path from each paper feed cassette 11 through the image forming section 3 and the fixing unit 14 to the ejected-paper tray 16, so that, every time a complete and correct passage of a paper sheet is detected, the total count stored in the memory section 19 is incremented. Furthermore, the control section 17 is connected through an interface 21 to the copier management device D, so that the copy count counted by the sheet-passage count sensor 20 is transmitted to that device D.

Figure 4:
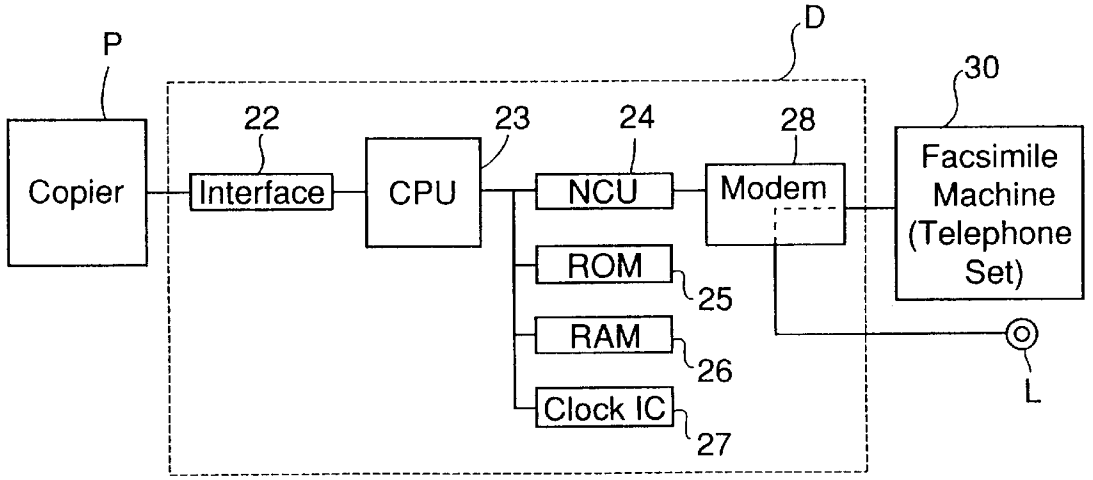
FIG. 4 is a block diagram showing the construction of the communications control device.

The copier management device D, which serves to transmit data required for managing the copier P, is, as shown in FIG. 4, equipped with a serial interface 22. The serial interface 22 is connected to a CPU 23. The CPU 23 is formed as a microcomputer system, and is connected to an NCU (network control unit) 24, a ROM 25, a RAM 26, and a clock IC 27. The NCU 24 is connected to a modem 28, and the modem 28 is in turn connected to a public telephone line L.

Note, however, that it is not practical to use the telephone line L exclusively for the device D of the copier. In reality, as described earlier, a telephone line for a facsimile machine (or telephone set) 29 is made to take a detour through the device D, and the device D is set for transmission only, so that, when the device D receives a call through the telephone line, the device D does not answer the call but transfers it to the facsimile machine or telephone set. Accordingly, in the management system of this embodiment, the host computer H cannot establish a connection with the device D without performing a special operation to enable the device to answer a call.

Figure 5:
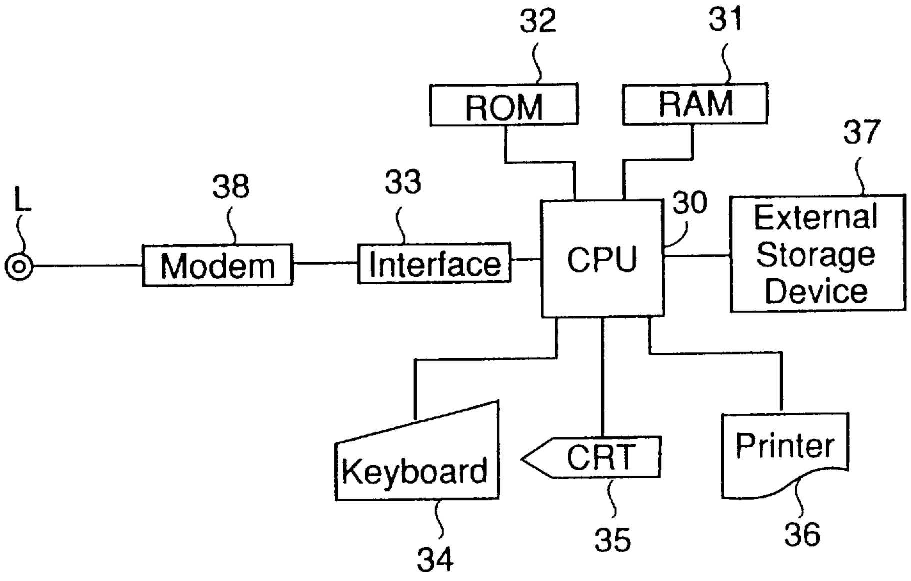
FIG. 5 is a block diagram showing the construction of the host computer.

As shown in FIG. 5, the host computer H is provided with a CPU 30, to which a RAM 31, a ROM 32, and an input/output interface 33 are connected. Moreover, to the CPU 30, a keyboard 34 for entering data, a CRT 35 for displaying data, a printer 36 for printing data, an external storage unit 37, and other devices are connected. The input/output interface 33 is provided with input/output terminals such as RS-232C ports, and is connected through a communications modem 38 to a public telephone line L.

The host computer H receives data transmitted from the device D and manages the copier P collectively on the basis of the received data. To achieve this, the host computer H not only receives from the device D every kind of data, including data for calling a serviceperson, concerning the copiers P, but also initializes data concerning the copier P. Here, initialization refers to an operation through which initial data, such as the telephone number of the host computer H, the time at which periodical dialing takes place, and the number of copies permitted to be made under the contract, is set on the device D. Moreover, the control section 17 of the copier P is capable of selectively executing one of several modes of service simulation incorporated in it, and the mode for initializing the device D is one of such modes.

Next, the procedure for initializing the device D in the above described construction will be described below. In this embodiment, the copier management system is so configured that the device D can be initialized from the copier P without using a copier ID or a check code, and without advance registration in the host computer H. Moreover, this copier management system also makes it possible to recover from an initialization failure that may occur during initialization based on advance registration in the host computer H.

Figure 6:
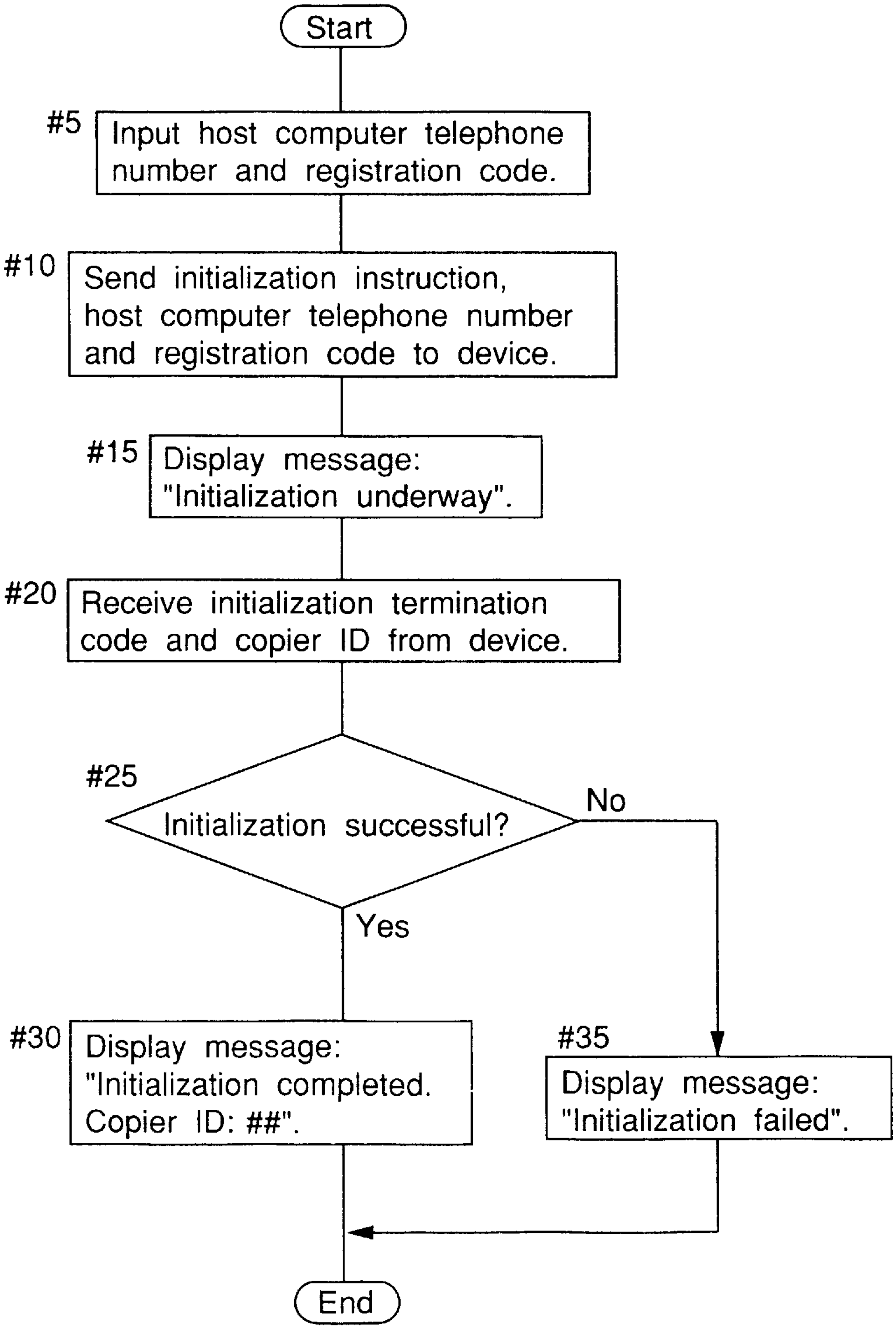
FIG. 6 is a flowchart showing the operation of the control section when device initialization has been selected in the service simulation mode of the copier.

FIG. 6 shows the operation of the control section 17 when initialization of the device D has been selected in the service simulation mode of the copier P. A serviceperson, having set up the copier P, operates the keys on the operation panel 18 to enter the telephone number of the host computer H and a code for registration. In step #5, the control section 17 of the copier P recognizes the input operation of the serviceperson, and, in step #10, it instructs the device D to conduct initialization, simultaneously sending thereto the telephone number of the host computer H and the registration code. Thus, initialization is started and, in step #15, a message "initialization underway" is displayed in the display section. The registration code is a reference number, which is specified as a target to be searched for at the time of re-initialization. The registration code is usually determined, for example, based on the combination of the ID number of the serviceperson and the copier model code.

Figure 7:
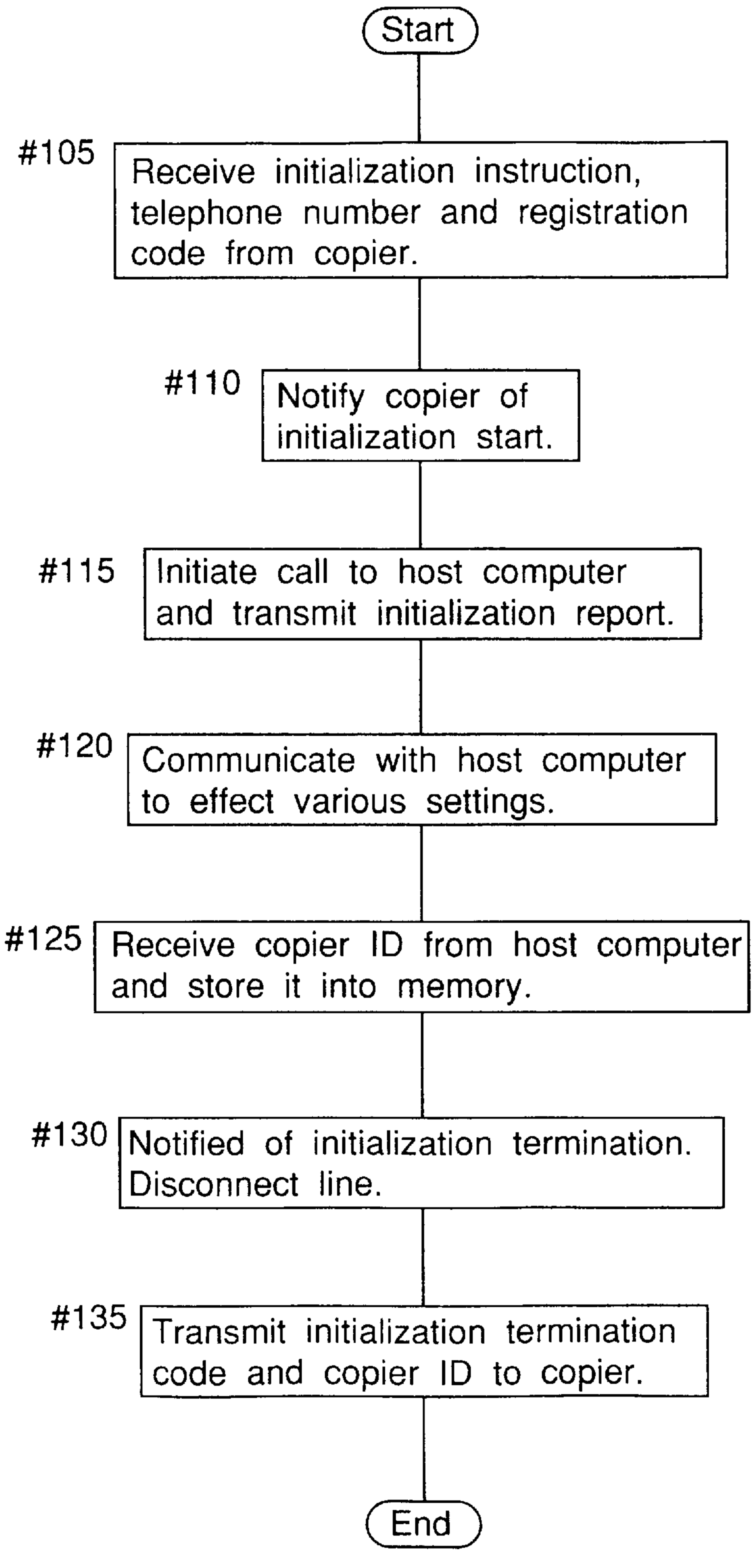
FIG. 7 is a flowchart showing the operation of the CPU of the device when it has been instructed by the copier to conduct initialization.

FIG. 7 shows the operation of the CPU 23 of the device D when it has been instructed by the copier P to conduct initialization. In step #105, the device D is instructed by the copier P to conduct initialization and receives therefrom the telephone number of the host computer H and the registration code. Then, in step #110, the device D transmits to the copier P a signal indicating the start of initialization and creates an initialization report. Subsequently, in step #115, the device D dials the specified telephone number to initiate a call to the host computer H, and then transmits the initialization report.

Figures 8, 9:
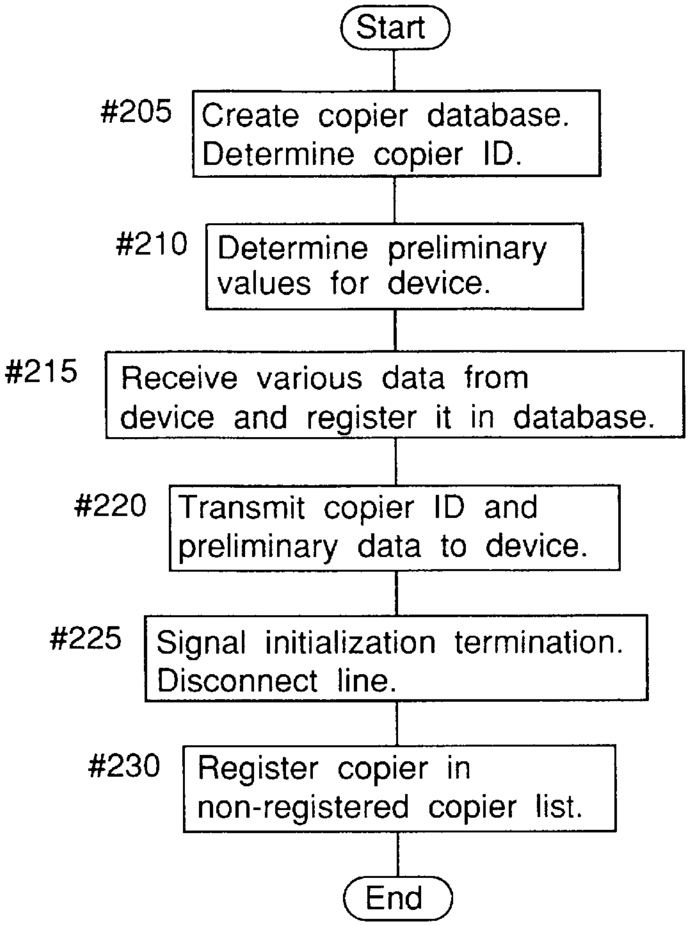
FIG. 8 is a flowchart showing the operation of the CPU of the host computer when it has received an initialization report form the device.
FIG. 9 is a diagram showing an example of the list of non-registered copiers.

FIG. 8 shows the operation of the CPU 30 of the host computer H when it has received an initialization report from the device D. When the host computer H receives the initialization report from the device D, then, in step #205, it creates a preliminary database for the copier P and determines its copier ID number. Subsequently, in step #210, the host computer H sets values on the device D based on predetermined values contained in the preliminary database. The predetermined values in the database include the date and time at which regular communication takes place, the total count of copies, the count of copies permitted to be made under contract, and others.

Thereafter, in step #215, the host computer H communicates with the device D to receive therefrom various data, and registers that data in the created database. When the communication has been completed without errors, then, in step #220, the host computer H transmits the copier ID number and preliminary settings to the device D. Subsequently, in step #225, the host computer H transmits a signal indicating the end of initialization and then disconnects the telephone line connecting to the device D.

Revert to FIG. 7. In step #120, which corresponds to step #215 in FIG. 8, the device D communicates with the host computer H to effect various settings, and then, in step #125, it receives the copier ID number from the host computer H and stores it in a predetermined area in the RAM 26. Subsequently, when, in step #130, the device D confirms that communication with the host computer H has been completed without errors, it disconnects the telephone line. Thereafter, in step #135, the device D transmits the copier ID to the copier P and terminates the operation.

Revert to FIG. 6. When, in step #20, the copier P receives an initialization termination code and the copier ID number from the device D, then, in step #25, it judges whether initialization has been successful or not. If initialization has been successful, then, in step #30, the copier P displays on its display section a message "initialization completed" followed by a display of the registered copier ID number, and then it terminates the operation. If initialization has been unsuccessful, then, in step #35, the copier P displays a message "initialization failed" and terminates the operation.

Revert to FIG. 8. In step #230, the host computer H, after disconnecting the telephone line connecting to the device D, registers the copier P in a list of non-registered copiers and terminates the operation.

As shown in FIG. 9, the list of non-registered copiers includes selection fields 39 for indicating selected items, date fields 40 for displaying registration dates, time fields 41 for registration time, PPC ID fields 42 for copier IDs, model field 43 for copier model names, and personal fields 44 for registration codes as well as serial number field 45 and setup count fields 46.

After completing initialization of a non-registered copier, the operator of the host computer H can open the screen of the non-registered copier list at any time by operating the keyboard 34 of the host computer H. Then, viewing that screen on the CRT the operator selects the corresponding copier P and proceeds with the registration operation of the copier P.

Figure 10:
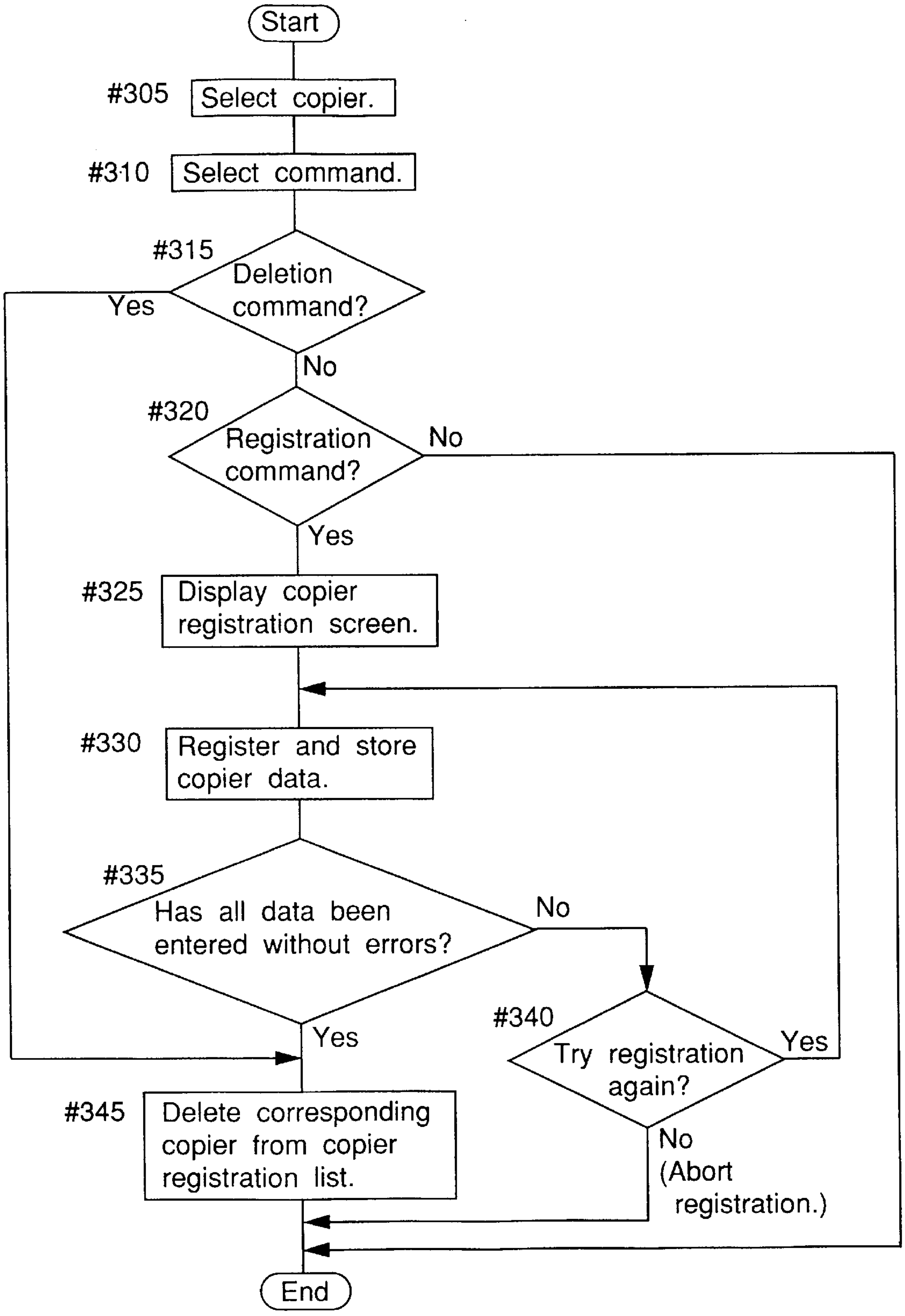
FIG. 10 is a flowchart showing the data registration procedure followed by the host computer when it registers data from a list of non-registered copiers.

FIG. 10 shows the data registration procedure followed by the host computer H when it registers data from a list of non-registered copiers. Registration of a copier P proceeds as follows. When, in step #305, the host computer H recognizes that the operator, by manipulating the selection fields 39 in the non-registered copier list, has selected the corresponding copier P and, in step #310, the host computer H recognizes that the operator has selected an execution command, then, in step #315, the host computer H judges whether the selected command is a deletion command or not. If it is a deletion command, then, in step #345, the host computer H deletes the corresponding copier P from the non-registered copier list.

If the selected command is not a deletion command, then, in step #320, the host computer H judges whether it is a registration command or not. If it is not a registration command, then the host computer H aborts registration. If the selected command is a registration command, then, in step #325, the host computer H opens the screen for copier registration and, in step #330, it registers and stores the data of the copier P. Thus, a database is made ready for use in the host computer H.

Subsequently, in step #335, the host computer H judges whether, as a result of the registration operation, all the data has been entered without errors or not. If there have been no errors, then, in step #345, the host computer H deletes the corresponding copier P from the non-registered copier list. If there is any data that is incorrect or missing, then, in step #340, the host computer H judges whether the errors can be corrected or not. If the errors are found to be correctable, then the host computer H, reverting to step #330, executes data registration and storage once again. If the errors are found to be not correctable, the host computer H aborts registration and terminates the operation.

Owing to the above described construction and operation, in this embodiment, the device D can be initialized from the copier P even if the copier P was not registered in the host computer H when the copier P was set up. Accordingly, the serviceperson does not need to memorize the copier ID number and the check code in order to conduct initialization, and it is possible to freely determine when to set up the copier P. Moreover, the initialization method of this embodiment is effective in recovering from an initialization failure that occurs during initialization based on data registered in the host computer H in advance.

Note that the present invention is applicable not only to copiers, but also to other types of image forming apparatus such as laser printers and facsimile machines.

As described above, according to the present invention, a managed piece of equipment initiates communication with a host computer to initialize the device, and, at the time of initialization, the managed piece of equipment does not need to have been registered in the host computer. Accordingly, it is not necessary to monitor the operation of the serviceperson who sets up the managed piece of equipment. Moreover, as against a method that requires advance registration in the host computer, the ID number of the managed piece of equipment and the check code do not need to be memorized, nor do they need to be registered in advance before the managed piece of equipment is set up. As a result, it is possible to freely choose when to set up the managed piece of equipment, and thus to cope with the cases where the user demands immediate delivery of a copier. Furthermore, it is possible to recover from an initialization failure that has occurred during initialization based on advance registration in the host computer.

Thus, according to the present invention, quite advantageously as against conventional methods, it is possible to initialize a communications control device from a managed piece of equipment without fail even if the data concerning that piece of equipment has not yet been registered in a host computer or even if the checking of a code has failed despite of such data having already registered in the host computer.

Obviously, many modifications and variations of the present invention are possible in light of the above teachings. It is therefore to be understood that within the scope of the appended claims, the invention may be practiced other than as specifically described.

What is claimed is:

1. An equipment management system comprising a terminal device that is attached to a managed piece of equipment so as to transmit equipment management data needed for managing that managed piece of equipment and a host computer that is connected to said terminal device by way of a data communication line so as to collectively manage said equipment management data, said host computer setting initial data on said terminal device, wherein said managed piece of equipment comprises an input operation means that inputs to said terminal device a registration code identifying said managed piece of equipment and thereafter conducts initialization, wherein said terminal device comprises a report creating means that creates an initialization report based only on said registration code when initialization is conducted, wherein said host computer comprises a database creating means that creates a database when an initialization report is received from said terminal device, and a non-registered equipment list creating means, and wherein said host computer determines setting values for said terminal device preliminarily based on predetermined values in said database and, when said terminal device has acknowledged completion of setting, said host computer registers equipment management data of a managed piece of equipment whose initialization has been completed in said non-registered equipment list.

2. An equipment management system as claimed in claim 1, wherein, when equipment management data of the managed piece of equipment freely selected from said list is registered and stored in the database, said non-registered equipment list creating means deletes equipment management data of that managed piece of equipment from the list.

* * * * *